(12) United States Patent
Kainuma et al.

(10) Patent No.: US 9,712,700 B1
(45) Date of Patent: Jul. 18, 2017

(54) IMAGE READING APPARATUS AND IMAGE FORMING APPARATUS COMPRISING SAME

(71) Applicant: KYOCERA Document Solutions Inc., Osaka (JP)

(72) Inventors: Takashi Kainuma, Osaka (JP); Shunsuke Yamasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/313,886

(22) PCT Filed: Feb. 27, 2015

(86) PCT No.: PCT/JP2015/055802
§ 371 (c)(1),
(2) Date: Nov. 23, 2016

(87) PCT Pub. No.: WO2015/198636
PCT Pub. Date: Dec. 30, 2015

(30) Foreign Application Priority Data

Jun. 26, 2014 (JP) ................................ 2014-130907

(51) Int. Cl.
*H04N 1/04* (2006.01)
*H04N 1/00* (2006.01)
(Continued)

(52) U.S. Cl.
CPC ....... *H04N 1/00557* (2013.01); *G03G 15/605* (2013.01); *H04N 1/00554* (2013.01);
(Continued)

(58) Field of Classification Search
CPC ............. H04N 1/1061; H04N 1/00342; H04N 1/00572; H04N 1/00835; H04N 1/32138; H04N 2201/0015; H04N 2201/0081
(Continued)

(56) References Cited

U.S. PATENT DOCUMENTS

2006/0233560 A1* 10/2006 Harada ............. G03G 15/0891
399/27
2007/0188826 A1* 8/2007 Jones ..................... G02B 1/105
358/474

(Continued)

FOREIGN PATENT DOCUMENTS

JP H05-273670 10/1993

*Primary Examiner* — Negussie Worku
(74) *Attorney, Agent, or Firm* — Stein IP, LLC

(57) ABSTRACT

An image reading apparatus (6) includes a document placing table (6a) to an upper surface of which a contact glass (25) is fixed, and a document pressing device (24) supported at an end of the document placing table (6a) to be openable/closable via a hinge portion, and having, on its back surface side, a document presser (30) that presses a document placed on the contact glass (25). The document pressing device (24) includes a light transmission window (31) transmitting light in a front-surface-to-back-surface direction of the document pressing device (24). The light transmission window (31) is disposed at a position not overlapping with the contact glass (25) when the document pressing device (24) is at the closure position, and when the document pressing device (24) has moved in an opening direction from the closure position, light that has passed through the light transmission window (31) reaches the contact glass (25).

5 Claims, 6 Drawing Sheets

(51) Int. Cl.
*G03G 15/00* (2006.01)
*H04N 1/10* (2006.01)

(52) U.S. Cl.
CPC ..... *H04N 1/10* (2013.01); *G03G 2215/00185* (2013.01); *H04N 2201/0081* (2013.01)

(58) Field of Classification Search
USPC ........................................................ 358/474
See application file for complete search history.

(56) References Cited

U.S. PATENT DOCUMENTS

| | | | |
|---|---|---|---|
| 2009/0051497 A1* | 2/2009 | Miyaso | B41J 3/50 340/10.4 |
| 2010/0202798 A1* | 8/2010 | Suzuki | G03G 15/0856 399/118 |
| 2016/0363905 A1* | 12/2016 | Wakimoto | G03G 21/1633 |

* cited by examiner

IMAGE READING APPARATUS AND IMAGE FORMING APPARATUS COMPRISING SAME

CROSS-REFERENCE TO RELATED APPLICATIONS

This application is a National Stage of International Application No. PCT/JP2015/055802, filed Feb. 27, 2015, which claims the benefit of priority to Japanese Application No. 2014-130907, filed Jun. 26, 2014, in the Japanese Patent Office, the disclosures of which are incorporated herein in their entireties by reference.

TECHNICAL FIELD

The present invention relates to an image reading apparatus used in apparatuses such as digital copiers and image scanners and configured to read documents by scanning, and an image forming apparatus including the same.

BACKGROUND ART

Conventionally, in copiers and the like employing a mirror-scanning method, there have been widely used image reading apparatuses that perform reading of a document by having the document placed on a contact glass fixed to a document placing table of a document reading portion, and moving (scanning) a carriage, which is provided below the contact glass and has a light source and a mirror mounted thereon, by means of a predetermined drive device, in a direction parallel to a surface to-be-copied of the document.

In such an image reading apparatus, after a document is set on the contact glass, reading of an image of the document is performed by holding the document in a shaded state by pressing it from above by means of a document pressing device. At this time, it is likely that the document is set with the document pressing device slightly lifted (that is, in a half-closed state). At this time, the document pressing device shades an area over the contact glass, making the document less visible to the user, and thus it is disadvantageously difficult for the user to set the document in a desired position.

As a method for easy recognition of a document setting position on the contact glass, Patent Literature 1 listed below, for example, discloses an image reading apparatus provided with a transparent or opaque document placing position indicating member that is disposed over a document placed on a contact glass, for helping to determine a position for placing the document. In the image reading apparatus disclosed in Patent Literature 1, various sheet-size frames are indicated on the document placing position indicating member by being printed thereon with a color to which a photosensitive member of a copier is not sensitive.

CITATION LIST

Patent Literature

Patent Literature 1: Japanese Patent Application Publication No. H05-273670

SUMMARY OF INVENTION

Technical Problem

However, even in the method disclosed in Patent Literature 1, some document pressing devices still shade and darken the area above the contact glass in a state where they are slightly lifted. As a result, the sheet-size frames printed on the document placing position indicating member cannot be read, which is a problem.

In view of the above problem, an object of the present invention is to provide an image reading apparatus that allows a document to be set at a desired position even in a state where a document pressing device is slightly lifted up, and an image forming apparatus including such an image reading apparatus.

Solution to Problem

To achieve the above object, a first aspect of the present invention is an image reading apparatus including a document placing table and a document pressing device. The document placing table has a contact glass which is fixed to an upper surface of the document placing table. The document pressing device is supported at an end of the document placing table to be openable/closable via a hinge portion, and has, on a back surface side thereof, a document presser that presses a document placed on the contact glass. The image reading apparatus reads a document placed on the contact glass, with the document pressing device disposed at a closure position where the document presser abuts the contact glass. Here, in the document pressing device, there is formed a light transmission window that transmits light in a front-surface-to-back-surface direction of the document pressing device. The light transmission window is disposed at a position that does not overlap with the contact glass when the document pressing device is at the closure position, and when the document pressing device has moved in an opening direction from the closure position, light that has passed through the light transmission window reaches the contact glass.

Advantageous Effects of Invention

According to the first aspect of the present invention, when the document pressing device is in a half-closed state, light that has passed through the light transmission window reaches the contact glass. This helps improve the visibility of a document placed on the contact glass, making it possible to set a document even in a state where the document pressing device is slightly lifted up from the document placing table. Moreover, since the light transmission window is disposed at a position that does not overlap with the contact glass when the document pressing device is at the closure position, there is no possibility of the light that has passed through the light transmission window having a negative effect on the reading of the document.

DESCRIPTION OF EMBODIMENTS

Figure 1:
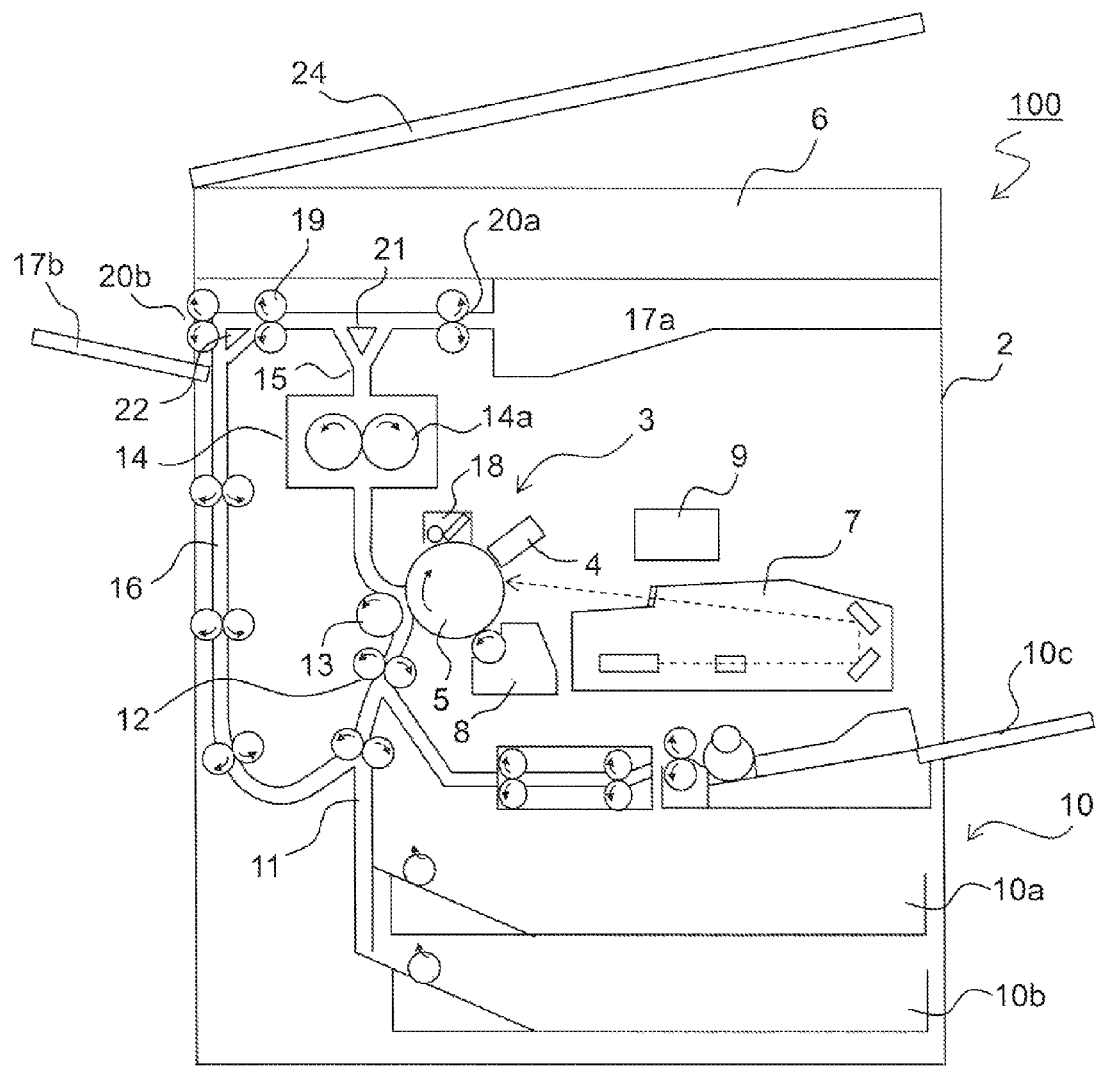
FIG. 1 is a schematic diagram showing an entire configuration of an image forming apparatus 100 incorporating an image reading apparatus 6 of the present invention.

Hereinafter, descriptions will be given of embodiments of the present invention with reference to the accompanying drawings. FIG. 1 is a schematic sectional view of an internal configuration of an image forming apparatus 100 incorporating an image reading apparatus 6 of the present invention. In FIG. 1, in the image forming apparatus 100 (as an example of which, a digital multifunction peripheral (MFP) is shown here), when performing copying operation, an image reading apparatus 6 reads document image data, and converts the document image data into an image signal. On the other hand, at an image forming portion 3 in an MFP main body 2, a photosensitive drum 5, which has a small diameter and rotates clockwise in the figure, is electrically charged uniformly by a charging unit 4. Then, an electrostatic latent image is formed on the photosensitive drum 5 by a laser beam from an exposure unit (such as a laser scanning unit) 7 based on the document image data read by the image reading apparatus 6, and developer (hereinafter referred to as toner) is caused to adhere to the electrostatic latent image by a developing unit 8 to produce a toner image. The toner is supplied to the developing unit 8 from a toner container 9.

Toward the photosensitive drum 5 having the toner image formed thereon as described above, a sheet is conveyed from a sheet feeding mechanism 10, via a sheet conveyance path 11 and a registration roller pair 12, to the image forming portion 3, where the toner image formed on the surface of the photosensitive drum 5 is transferred onto the sheet by a transfer roller 13 (an image transfer portion). Then, the sheet having the toner image transferred thereon is separated from the photosensitive drum 5, and conveyed to a fixing portion 14 having a fixing roller pair 14a, and there, the toner image is fixed on the sheet. The sheet having passed through the fixing portion 14 is conveyed to a sheet conveyance path 15, which branches into a plurality of conveyance directions. The sheet is then guided in one of the plurality of conveyance directions by a path switching mechanism 21, 22, which is provided at a branch point in the sheet conveyance path 15 and has a plurality of path switching guides. The thus-guided sheet is then discharged as it is (or after being conveyed to a reverse sheet conveyance path 16 for two-side copying) via a discharge roller pair 20a or a discharge roller pair 20b onto a sheet discharge portion including a first discharge tray 17a or a second discharge tray 17b.

On a downstream side of a cleaning device 18 with respect to a rotation direction of the photosensitive drum 5, there is provided a static eliminator (unillustrated), which removes residual charge from the surface of the photosensitive drum 5. The sheet feeding mechanism 10 is provided with a plurality of sheet feeding cassettes 10a and 10b detachably attached to the MFP main body 2, in which sheets are accommodated, and a stack bypass (a manual feed tray) 10c, which is provided above them. These sheet feeding cassettes 10a, 10b, and the stack bypass 10c are connected via the sheet conveyance path 11 to the image forming portion 3 that includes the photosensitive drum 5, the developing unit 8, etc. At an end of the image reading portion 6, a platen (a document pressing device) 24 for pressing and holding a document placed on a contact glass 25 (see FIG. 2) is provided in an openable/closable manner.

The sheet conveyance path 15 is specifically divided into two paths which extend rightward and leftward from a position on a downstream side of the fixing roller pair 14a, and one of the paths (the path extending rightward in FIG. 1) leads to the first discharge tray 17a. The other path (the path extending leftward in FIG. 1) extends through a conveyance roller pair 19 and is then divided into two paths which extend upward and downward. One of these paths (the path extending upward in FIG. 1) leads to the second discharge tray 17b. On the other hand, the other path (the path extending downward in FIG. 1) leads to the reverse sheet conveying path 16.

Figure 2:
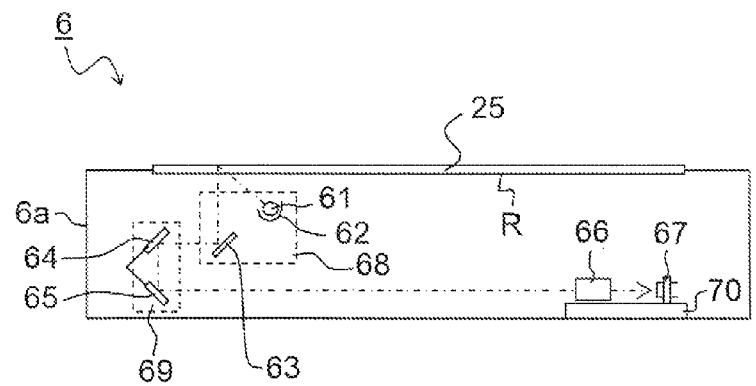
FIG. 2 is a side sectional view of an image reading apparatus 6 of the present invention.

Next, a description will be given of a configuration of an image reading apparatus 6 for reading an image of a document as an electrical signal. FIG. 2 is a side sectional view of an internal structure of an image reading apparatus 6 according to the present embodiment. In a frame 6a of the image reading apparatus 6, there are disposed a lamp (a light source) 61 for irradiating an image surface of a document with light, a reflection plate 62 for efficiently giving light from the lamp 61 to the image surface of the document, a first mirror 63 which directly receives and reflects light reflected from the document, a second mirror 64 which receives and reflects light reflected from the first mirror 63, and a third mirror 65 which receives and reflects light reflected from the second mirror 64.

Further, on a base plate 70, there are disposed a lens barrel 66 holding a lens group (not shown) which introduces and condenses light reflected from the third mirror 65, and a line-type CCD (a photoelectric conversion member) sensor 67 including a photoelectric conversion element which receives light reflected from the document and condensed by the lens group of the lens barrel 66, and converts the received light into an electrical signal. In the figure, an optical path of the light reflected from the document is indicated by a dashed dotted line.

Here, the lamp 61, the reflection plate 62, and the first mirror 63 are integrally fixed on a first carriage 68, and on the other hand, the second mirror 64 and the third mirror 65 are integrally fixed on a second carriage 69. The first and second carriages 68, 69 constitute scanning means, and are capable of reciprocating in cooperation with, but independently from, each other.

When the reading operation of an image of a document placed on the contact glass 25 is performed, the first carriage 68 and the second carriage 69 reciprocate (move for scanning) below an image reading region R of the contact glass 25 while mutually maintaining an optical path length of the light reflected from the document to be constant. The first carriage 68 and the second carriage 69 are configured to be driven by an unillustrated carriage drive motor.

With such a configuration, document reflection light, which is the light emitted from the lamp 61 and reflected from the image surface of the document, is reflected by the first to third mirrors 63 to 65 to be introduced into the lens group in the lens barrel 66, and is condensed by the lens group, to form an image on the CCD sensor 67. The light of the formed image is then subjected to photoelectric conversion processing at the CCD sensor 67, such that the light of the formed image is decomposed into pixels at the CCD sensor 67, and is thereby converted into an electrical signal reflecting the density at each pixel, whereby the reading of the image is performed.

Figure 3:
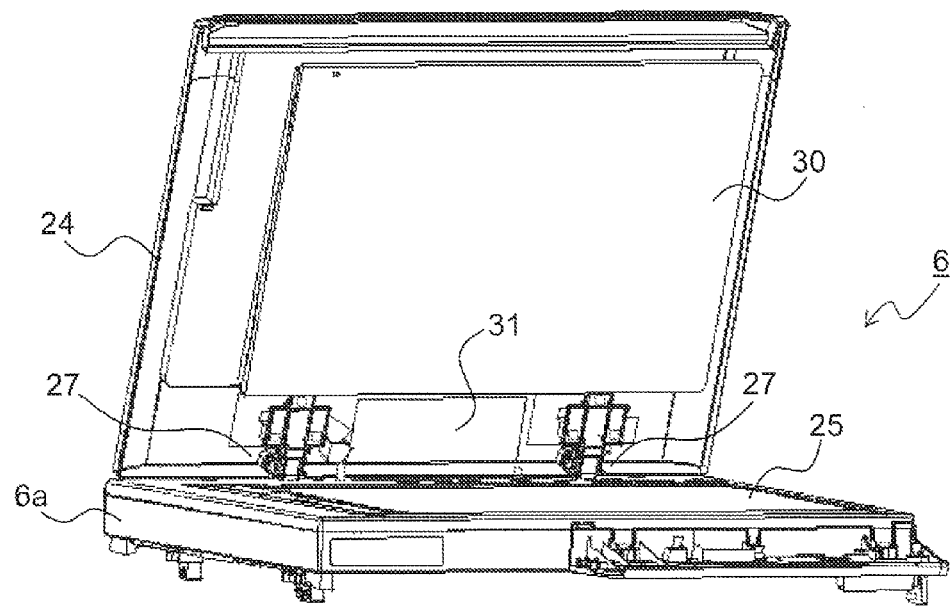
FIG. 3 is a perspective view of an image reading apparatus 6 according to a first embodiment of the present invention, and shows a state where a platen 24 is fully opened.

FIG. 3 is a perspective view of an image reading apparatus 6 according to a first embodiment of the present invention, and shows a state where a platen 24 is fully opened. The image reading apparatus 6 includes a contact glass 25 that is provided at an upper surface of a frame 6a (a document placing table), and a platen 24 that presses and thereby holds a document D placed on the contact glass 25. The platen 24 is supported to be openable/closable in a vertical direction by two hinge portions 27 provided at two positions at an end portion of the upper surface of the frame 6a. Further, on a back surface of the platen 24, there is provided a white mat 30 (a document presser) which directly presses the document D.

The platen 24 is also provided with a light transmission window 31 that is disposed between the two hinge portions 27, at a position that does not overlap with the white mat 30. The light transmission window 31 is formed by fitting a light transmissive member 33 (see FIG. 5) made of transparent resin, glass, or the like into a rectangular opening formed in the platen 24.

Figure 4:
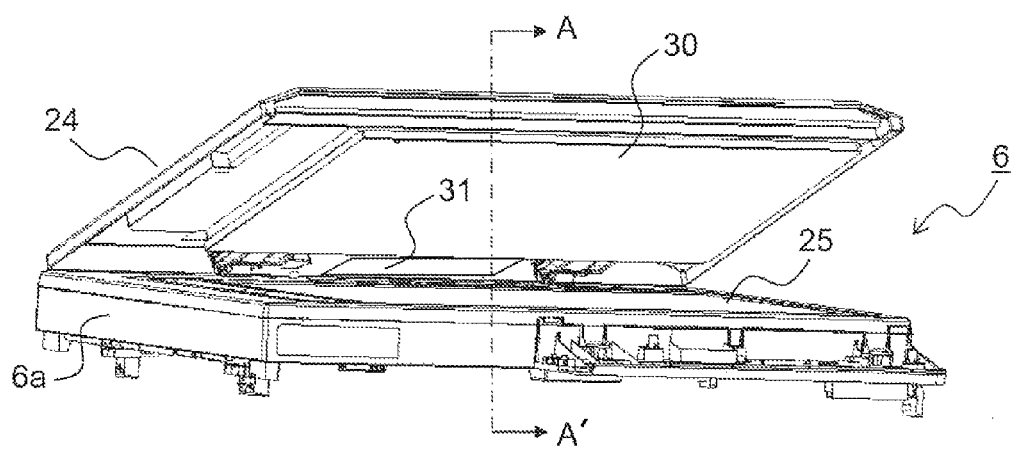
FIG. 4 is a perspective view showing a state where the platen 24 has been closed by a predetermined angle from the state shown in FIG. 3.
Figure 5:
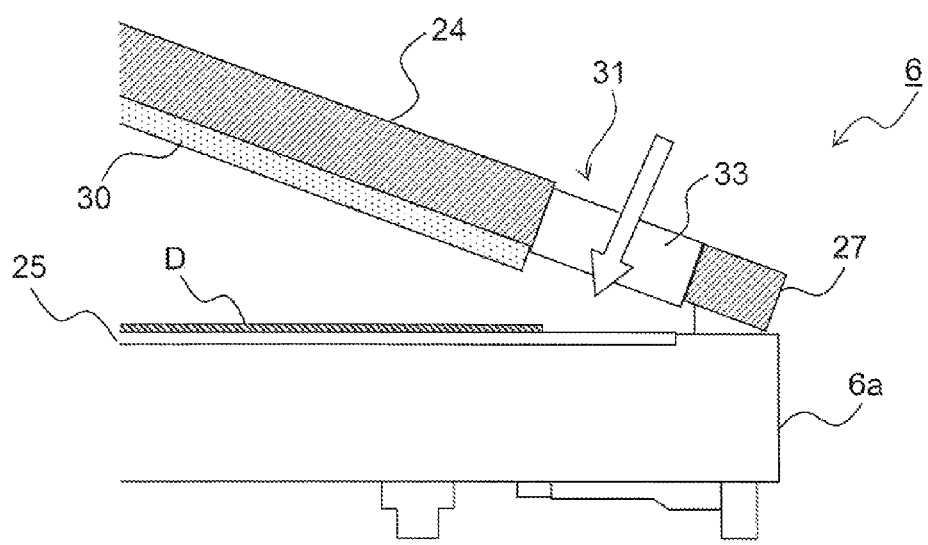
FIG. 5 is a side sectional view of a part of the image reading apparatus 6 of FIG. 4 including a light transmission window 31.

FIG. 4 is a perspective view of the image reading apparatus 6 of the first embodiment, showing a state where the platen 24 is closed by a predetermined angle from the state shown in FIG. 3, and FIG. 5 is a sectional view (taken along line AA' in FIG. 4) of a part including the light transmission window 31 of the image reading apparatus 6 shown in FIG. 4. In the image reading apparatus 6 of the present embodiment, since the light transmission window 31 is provided in the platen 24, as shown in FIG. 5, even when the platen 24 is in a half-closed state, light that has passed through the light transmission window 31 is not prevented from reaching the contact glass 25. This helps improve visibility of a document D placed on the contact glass 25, and thus allows a user to perform document-D setting operation with the platen 24 lifted slightly. Further, since the light transmission window 31 is formed close to the hinge 27, at a position that does not overlap with the white mat 30, it is possible to effectively guide light to a far part of the contact glass 25 where it tends to be dark with shade of the platen 24 when the platen 24 is in a half-closed state.

Figure 6:
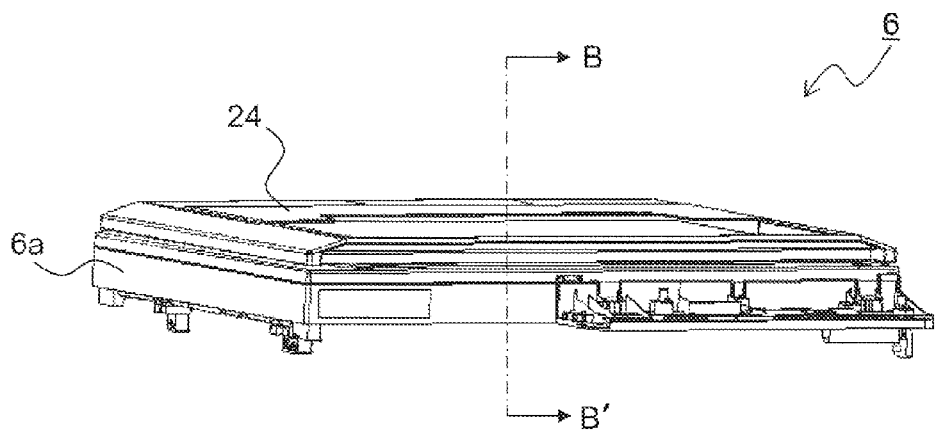
FIG. 6 is a perspective view showing a state where the platen 24 has been completely closed from the state shown in FIG. 4.
Figure 7:
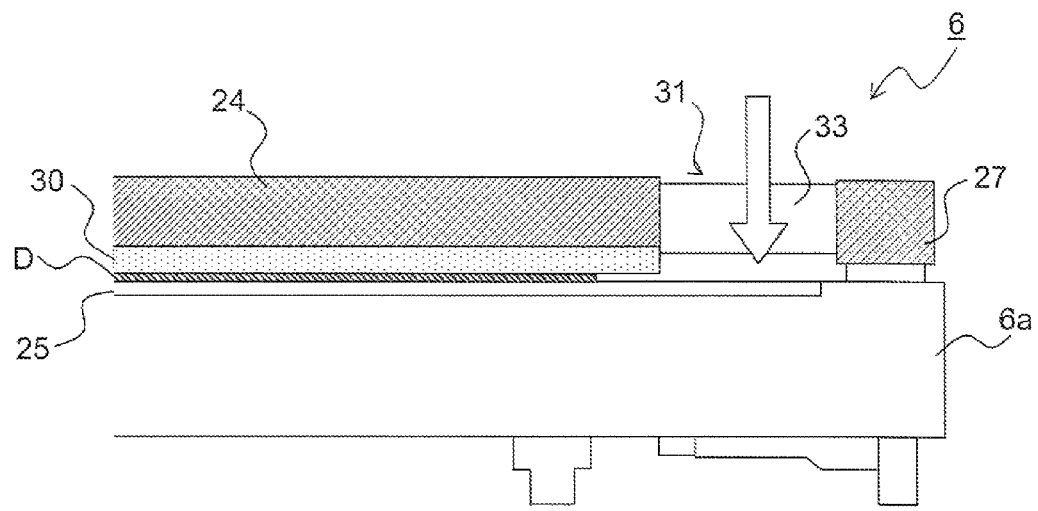
FIG. 7 is a side sectional view of a part of the image reading apparatus 6 of FIG. 6, including a light transmission window 31.

FIG. 6 is a perspective view of the image reading apparatus 6 of the first embodiment, and shows a state where the platen 24 has been completely closed from the state shown in FIG. 4, and FIG. 7 is a sectional view (taken along line BB' in FIG. 6) of a part of the image reading apparatus 6 in FIG. 6. As shown in FIG. 7, in a state where the platen 24 is completely closed, the white mat 30 is uniformly pressed against the contact glass 25. As a result, with the document D on the contact glass 25 being pressed down by the white mat 30 from above, a surface to be copied of the document D is allowed to be firmly in contact with the contact glass 25. In this state, the first carriage 68 and the second carriage 69 (see FIG. 2) reciprocate below an image reading region R of the contact glass 25 while maintaining an optical path length of the light reflected from the document to be constant, and thereby reading of an image of the document is performed Thus, when the platen 24 is completely closed, the light transmission window 31 does not overlap with the contact glass 25, and the white mat 30 covers the contact glass 25, transmission light (indicated by a white arrow in FIG. 7) that has passed through the light transmission window 31 does not reach the document D. Accordingly, there is no possibility of the transmission light coming through the light transmission window 31 having adverse effects on the reading of the document D.

In the present embodiment, the light transmission window 31 is formed by fitting the light transmissive member 33 in an opening in the platen 24, but the light transmission window 31 may be formed as just an opening without fitting the light transmisive member 33 into the opening.

Figure 8:
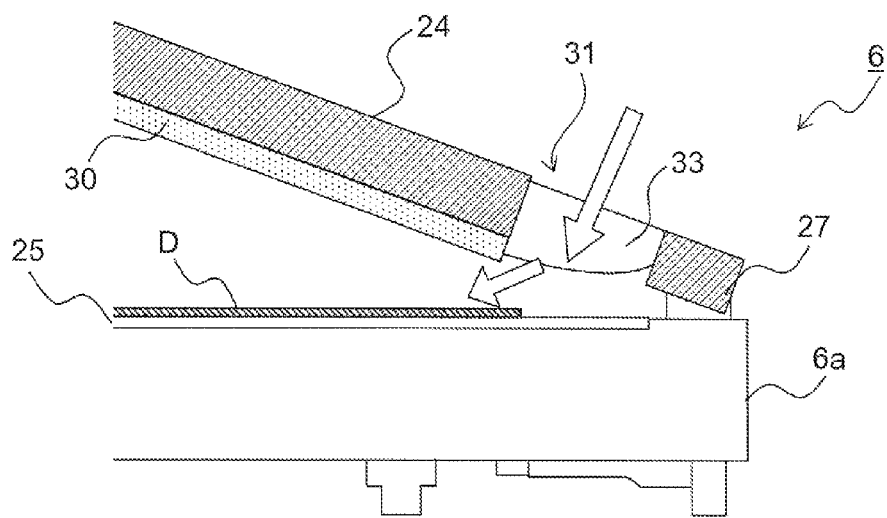
FIG. 8 is a side sectional view of a part of an image reading apparatus 6 according to a second embodiment of the present invention including a light transmission window 31, and shows a state where a platen 24 has been closed by a predetermined angle.

FIG. 8 is a side sectional view of a part of an image reading apparatus 6 according to a second embodiment of the present invention, and shows a state where a platen 24 has been closed by a predetermined angle from a fully opened state. In the present embodiment, a lens-shaped light transmissive member 33 that refracts light is fitted in a light transmission window 31. The other portions of the image reading apparatus 6 of the present embodiment are configured the same as those of the first embodiment, and thus overlapping descriptions thereof will not be repeated.

The lens-shaped light transmissive member 33 guides transmission light that has passed through the light transmission window 31 toward a document D placed on a contact glass 25, and this helps further improve the visibility of the document D placed on the contact glass 25 even when the platen 24 is in a half-closed state.

Figure 9:
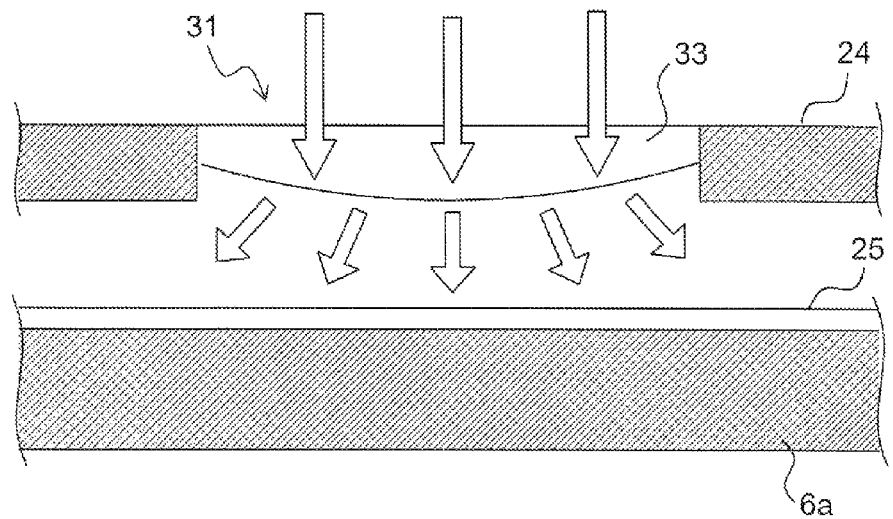
FIG. 9 is a front sectional view of a part of an image reading apparatus 6 according to a third embodiment of the present invention including a light transmission window 31, and shows a state where a platen 24 has been closed by a predetermined angle.

FIG. 9 is a sectional view of an image reading apparatus 6 according to a third embodiment of the present invention, and shows a part of the image reading apparatus 6 as seen from a front side (a side of a rotation end of a platen 24), in a state where the platen 24 has been closed by a predetermined angle from a fully opened state. The present embodiment, where a lens-shaped light transmissive member 33 which refracts light is fitted in a light transmission window 31 as in the first embodiment, is different from the first embodiment in the shape of the light transmissive member 33. The other portions of the image reading apparatus 6 of the present embodiment are configured the same as those of the first and second embodiments, and thus overlapping descriptions thereof will not be repeated.

As shown in FIG. 9, the light transmissive member 33 has a flat light entrance surface (an upper surface in FIG. 9) and a convex light exit surface (a lower surface in FIG. 9), and its thickness gradually increases from its both ends toward its center in a width direction of the light transmission window 31 (a right-left direction in FIG. 9). Light (indicated by white arrows in FIG. 9) incident on the light transmissive member 33 passes therethrough, to be thereby refracted in a width direction of a contact glass 25 (the right-left direction in FIG. 9).

Thereby, the transmission light passed through the light transmission window 31 is guided in a manner spread outward widthwise from a center of a document D placed on the contact glass 25, and thus, even when the platen 24 is in a half-closed state, the visibility of the document D is further improved over its width direction.

Figure 10:
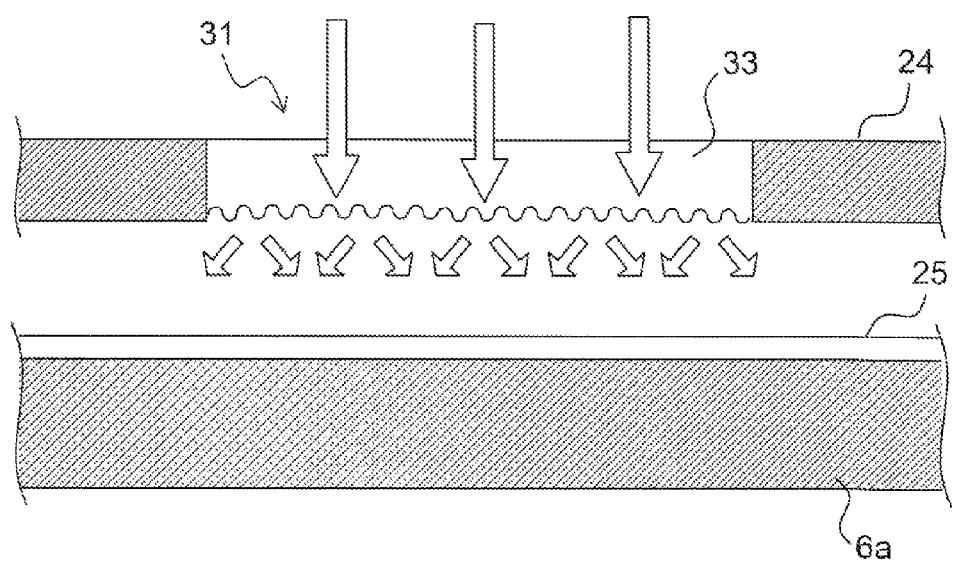
FIG. 10 is a front sectional view of a part of an image reading apparatus 6 according to a fourth embodiment of the present invention including a light transmission window 31, and shows a state where a platen 24 has been closed by a predetermined angle.

FIG. 10 is a sectional view of an image reading apparatus 6 according to a fourth embodiment of the present invention, and shows a part of the image reading apparatus 6 as seen from a front side (a side of a rotation end of a platen 24), in a state where the platen 24 has been closed by a predetermined angle from a fully opened state. In the present embodiment, a light transmissive member 33 which scatters transmission light is fitted in a light transmission window 31. The other portions of the image reading apparatus 6 of the present embodiment are configured the same as those of the first to third embodiments, and thus overlapping descriptions thereof will not be repeated.

As shown in FIG. 10, the light transmissive member 33 has a flat light entrance surface (an upper surface in FIG. 10), and a granulated (pear-skin) light exit surface. Light (indicated by white arrows in FIG. 10) incident on the light transmissive member 33 passes therethrough, to thereby become scattered light which is scattered in irregular directions.

Thereby, the transmission light passed through the light transmission window 31 becomes scattered light and is guided in a manner scattered over the contact glass 25, and this helps further improve the visibility of a document D placed on the contact glass 25 in width and depth directions of the document D even when the platen 24 is in a half-closed state.

The present invention is not limited to the above embodiments, and various modifications may be made without departing from the scope of the present invention. For example, by combining the second and third embodiments, and by using such a light transmissive member 33 as refracts light passing therethrough both in a direction toward a contact glass 25 (a left direction in FIG. 8) and in a width direction of the contact glass 25 (the right-left direction in FIG. 9), it is possible to improve the visibility of the document D in its width and depth directions as in the fourth embodiment.

The above descriptions of the embodiments each have dealt with an image reading apparatus 6 without an auto document feeder attached to an upper surface of a platen 24, but the present invention is applicable also to an image reading apparatus provided with an auto document feeder. In that case, an external cover and a document tray constituting an auto document feeder may at least partly be formed of a transparent material, or an opening may be formed therein as a light transmission window 31. With such a configuration, it is possible to set or replace a document with a platen in a half-closed state, and thus to reduce operational burden on the user.

The above descriptions of the embodiments each have dealt with, as a reading method employed in the image reading apparatus 6, a CCD sensor method in which the CCD sensor 67 shown in FIG. 2 is used, but the present invention is applicable also to an image reading apparatus that employs a CIS sensor method in which a photoelectric conversion element called a CMOS (complementary MOS) sensor is used.

An image forming apparatus incorporating the image reading apparatus of the present invention is not limited to a digital MFP as shown in FIG. 1, but the image reading apparatus of the present invention is of course applicable to other types of image forming apparatuses such as analogue copiers and color copiers, or image scanners used separately from image forming apparatuses.

INDUSTRIAL APPLICABILITY

The present invention is applicable to an image reading apparatus that scans, and thereby reads, a document in a state held by a document pressing device. By using the present invention, it is possible to provide a highly operable image reading apparatus that allows a document to be set in a desired position even with a document pressing device lifted slightly, and an image forming apparatus including such an image reading apparatus.

The invention claimed is:

1. An image reading apparatus comprising:
   a document placing table to an upper surface of which a contact glass is fixed; and
   a document pressing device which is supported at an end of the document placing table to be openable/closable via a hinge portion, and has, on a back surface side thereof, a document presser that presses a document placed on the contact glass,
   the image reading apparatus reading a document placed on the contact glass, with the document pressing device disposed at a closure position where the document presser abuts the contact glass,
   wherein
   a light transmission window which transmits light in a front-surface-to-back-surface direction of the document pressing device is formed in the document pressing device,
   the light transmission window is disposed at a position that does not overlap with the contact glass when the document pressing device is at the closure position, and when the document pressing device has moved in an opening direction from the closure position, light that has passed through the light transmission window reaches the contact glass, and
   the light transmission window comprises a light transmissive member that is fitted in the light transmission window, that refracts light incident thereon from a front surface side of the document pressing device in a direction approaching the contact glass, and that causes the light to be emitted through a back surface side of the document pressing device.

2. The image reading apparatus according to claim 1, wherein
   the light transmission window is formed near the hinge portion, at a position that does not overlap with the document presser.

3. The image reading apparatus according to claim 2, wherein
   the light transmission window is formed in a central part of the document pressing device in a width direction of the document pressing device which is a direction perpendicular to an opening/closing direction of the document pressing device.

4. An image forming apparatus comprising the image reading apparatus according to claim 1.

5. An image reading apparatus comprising:
   a document placing table to an upper surface of which a contact glass is fixed; and
   a document pressing device which is supported at an end of the document placing table to be openable/closable via a hinge portion, and has, on a back surface side thereof, a document presser that presses a document placed on the contact glass,
   the image reading apparatus reading a document placed on the contact glass, with the document pressing device disposed at a closure position where the document presser abuts the contact glass,
   wherein a light transmission window which transmits light in a front-surface-to-back-surface direction of the document pressing device is formed in the document pressing device, the light transmission window is disposed at a position that does not overlap with the contact glass when the document pressing device is at the closure position, and when the document pressing device has moved in an opening direction from the closure position, light that has passed through the light transmission window reaches the contact glass, the light transmission window is formed in a central part of the document pressing device in a width direction of the document pressing device which is a direction perpendicular to an opening/closing direction of the document pressing device, at a position that does not overlap with the document presser and close to the hinge portion, and the light transmission window comprises a light transmissive member that is fitted in the light transmission window, that refracts light incident thereon from a front surface side of the document pressing device in directions spread in a width direction of the document placing table, and that causes the light to be emitted through a back surface side of the document pressing device.

* * * * *